Sept. 15, 1953

A. F. DIETRICH

APPARATUS FOR MODIFYING THE AMPLITUDE RANGE OF MICROWAVE SIGNALS

Filed Sept. 30, 1949

2,652,540

INVENTOR
A. F. DIETRICH
BY George C. Lord
ATTORNEY

Patented Sept. 15, 1953

2,652,540

UNITED STATES PATENT OFFICE 2,652,540

APPARATUS FOR MODIFYING THE AMPLITUDE RANGE OF MICROWAVE SIGNALS

Anselm F. Dietrich, West Long Branch, N. J., assignor to Bell Telephone Laboratories, Incorporated, New York, N. Y., a corporation of New York Application September 30, 1949, Serial No. 118,856

8 Claims. (Cl. 333—14)

This invention relates to apparatus for modifying the amplitude range of applied waves and more particularly to compressors or limiters for use at microwave frequencies.

In some applications of microwave systems transmission characteristics which are non-linear functions of the signal amplitude level are required. In frequency modulation systems, for example, it may be necessary to employ a form of compression in order to obtain what is essentially limiter action. In such applications it is necessary that less gain be provided for high level signals than for low level signals. When such characteristics are required in microwave equipment, it is particularly advantageous to obtain them without recourse to complicated vacuum tube circuits.

Accordingly, it is an object of this invention to provide ultra-high frequency circuits capable of producing non-linear transmission characteristics and suitable for use as compressor circuits.

It is a further object of the invention to provide circuits for these applications which do not require the use of vacuum tubes and which are simple to construct and adjust.

In accordance with these objects the invention in one aspect involves apparatus for use in modifying the amplitude range of an applied wave which comprises a wave-guide junction having at least two pairs of conjugate arms or branches extending therefrom. Input and output connections are provided for the respective branches of one of the pairs of arms and a non-linear impedance element is mounted in at least one of the branches of the other conjugate pair.

In another aspect the invention relates to a structure of the type just described, modified, however, by the provision of identical non-linear impedance elements for each of the arms of the conjugate pair not included in the input and output connections and the provision of phase shifting means in one of the branches or arms that includes an impedance element.

A variation of the general structure disclosed herein for use as an expander is disclosed and claimed in an application of C. C. Cutler, Serial No. 118,890, filed on even date herewith.

The above and other features of the invention will be described in detail in the following specification taken in connection with the drawings, in which.

Figure 1:
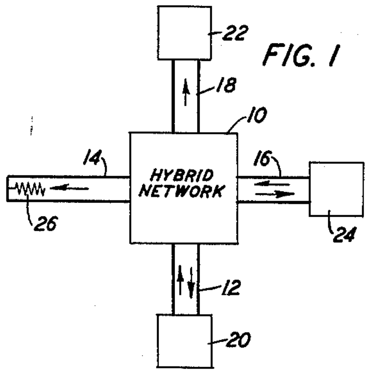
Fig. 1 is a block schematic diagram of a hybrid network which is provided with appropriate circuits in accordance with the invention.

In Fig. 1 there is shown a hybrid network 10 having arms or branches 12, 14, 16 and 18 to which appropriate circuit connections are made to permit modification of the amplitude range of signals applied from an external source 20. Arms 12 and 18 and 14 and 16, respectively, constitute pairs of conjugate arms of the hybrid and are characterized by the fact that no energy may be transmitted directly from one arm of such a pair to the other arm of that pair and that the connections to the respective arms of such a conjugate pair may be interchanged without effect upon the performance of the circuit. Thus no energy is transmitted directly from arm 12 connected to source 20 into arm 18 which is connected to an output circuit 22.

For operation at ultra-high frequencies, the hybrid network may constitute the familiar wave-guide hybrid junction, sometimes known as the "magic T," which is described, for example, in an article entitled "Hybrid Circuits for Microwaves" by W. A. Tyrrell, Proceedings of the I. R. E., November 1947, at page 1294. Other hybrid circuits of equivalent type may also be employed.

In the application of the hybrid network of Fig. 1 as a compressor let it be assumed that a microwave signal is applied to input arm 12 from a source 20. This signal is transmitted to the hybrid network 10 and is divided therein between arms 14 and 16. Arm 14 is terminated in a matching impedance element 26 which absorbs the incident energy transmitted into this arm or branch of the hybrid. Arm 16, on the other hand, is terminated in a non-linear impedance element 24 which matches the impedance of the arm at one amplitude level only.

In order to cause operation of the device as a compressor, non-linear impedance 24 is matched to arm 16 at a high amplitude level, as for example, at the maximum signal level to be applied to the circuit. Accordingly, all signals of amplitude less than the maximum amplitude level are reflected to a greater or lesser degree and the reflected energy returns to the hybrid network 10. Here division of the reflected wave occurs and a portion of the reflected energy returns through arm 12 to source 20 while the remainder of the reflected energy traverses arm 18 and appears in an output circuit 22 connected thereto.

If, as disclosed in the application of C. C. Cutler referred to above, the non-linear impedance 24 is matched to arm 16 at a low amplitude level rather than a high amplitude level, the impedance mismatch occurring at larger amplitude levels will increase the ratio of reflected to incident energy and thereby increase the output appearing in arm 18 by a larger factor than the corresponding increase of the input signal. Under these conditions an expansion characteristic is obtained.

Figure 2:
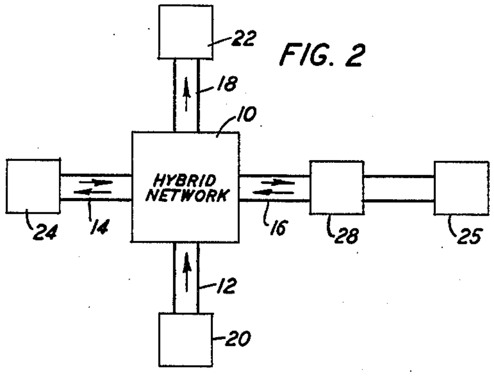
Fig. 2 is a block schematic diagram of a modification of the circuit of Fig. 1 to permit the use of two impedance elements for the purpose of obtaining greater output signals.

Fig. 2 illustrates a modification of the circuit of Fig. 1 to increase the efficiency thereof. In this circuit a signal from the source 20 is applied through arm 12 to a hybrid network 10 which may be identical to that of Fig. 1. The conjugate arms 14 and 16 are terminated in identical non-linear impedances 24 and 25 and a phase shifting network 28 is inserted in one of the conjugate arms of the pair not associated with the input and output circuits. As shown in Fig. 2, for example, phase shifter 28 is inserted in transmission line 16. The fourth transmission line 18 is connected to an output circuit 22 as in the circuit shown in Fig. 1.

In the circuit of Fig. 2 energy incident upon arm 12 is divided in hybrid network 10 and appears in conjugate arms 14 and 16. Non-linear impedances 24 and 25 which are conveniently identical in character are matched to the respective arms 14 and 16 at a desired amplitude level. Thus, if a compressor characteristic is desired the non-linear impedances are matched to the arms in which they are mounted at high energy levels as in the case of impedance 24 in the circuit of Fig. 1. In each arm the energy incident upon the non-linear impedance is more or less reflected depending upon the amplitude level of such energy and returns to hybrid junction 10. Since, however, it is characteristic of a hybrid network of the type herein contemplated that the energies incident upon arms 14 and 16 in response to the application of energy to arm 12 are in phase opposition, the reflected energies returning to the hybrid junction or network will also be in phase opposition. Accordingly, complete cancellation occurs within the network when the arms are similarly terminated and no energy is available for application to output arm 18. It is because of this effect that phase shifting device 28 is inserted in one of the pair of conjugate arms in which the non-linear impedances are located. Phase shifting device 28 is adjusted to produce a phase difference of 90 degrees in both the incident and reflected waves. As a result the two waves reflected from the non-linear impedances return to hybrid network 10 in phase. Under these conditions the two waves add in arm 18. On the other hand, the two waves add in phase opposition in arm 12 and are thus completely canceled. This is advantageous in that the reflected waves have no effect on the impedance which is presented to the incoming wave from source 20. The reflected waves add on a voltage basis in branch 18 so that the total amount of energy transmitted into the output circuit 22 is four times that which would be transmitted thereto in the circuit of Fig. 1 and is equal to the total power reflected from the two non-linear impedances.

Figure 3:
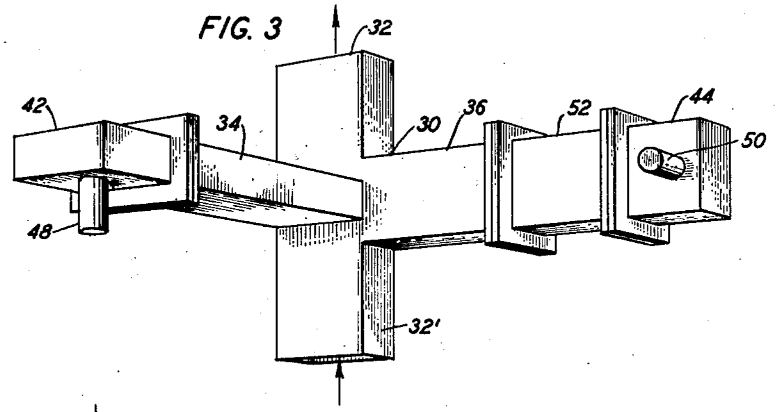
Fig. 3 is a perspective drawing of a wave-guide circuit corresponding to the block diagram of Fig. 2.

Fig. 3 illustrates an embodiment of the invention employing wave-guide components. The hybrid network comprises a wave-guide hybrid T 30 which is of the well-known type referred to above. This junction comprises three mutually perpendicular wave guides one of which extends in both directions from the junction forming, with the other two wave guides, four arms. It may be considered as consisting of a main wave guide 32—32′ to which are connected equivalent series and shunt wave-guide branches 34 and 36. The four arms of the hybrid junction thus consist of the ends 32 and 32′ of the main wave guide extending from the two sides of the junction and wave guides 34 and 36. As shown in Fig. 3 the pair of conjugate arms 32 and 32′ are employed as input and output circuits, respectively. Arms 34 and 36 form a second pair of conjugate arms which are terminated in non-linear impedances. These non-linear impedances may comprise crystal rectifiers, thermistors, or othe non-linear devices the impedance range of which is appropriate to permit matching to practical wave guides. As indicated in Fig. 3, the non-linear impedance terminations consist respectively of wave-guide structures 42 and 44 connected to wave-guide arms 34 and 36. Each of these structures includes a mount shown schematically at 48 and 50 respectively which may support a silicon of germanium crystal rectifier in cooperative relationship to the wave guide.

In one structure of this type the crystal is mounted within the wave guide and extends thereacross, one terminal of the crystal being connected directly to the wall of the guide and the other terminal being capacitively connected to the opposite wall. In an alternative arrangement, the crystal is mounted exteriorly of the wave guide in a section of coaxial line, the inner conductor of which extends into the guide and serves as a pick-up probe. An additional section of wave guide 52 is connected between wave guide 36 and terminating structure 44 and is made of such length as to provide the 180-degree round-trip phase displacement referred to above in connection with the description of Fig. 2. The structures 42 and 44 are designed to have identical impedances, preferably by the use of identical construction with identical crystals mounted therein.

In considering the characteristics of such crystals and their action in the circuit of the invention, silicon rectifiers may be taken as an example. It will be recalled that such rectifiers have a non-linear voltage versus current characteristic. When a sinusoidal wave is applied across the crystal, the effective impedance of the crystal depends upon what part and how much of the voltage versus current characteristic of the crystal is covered by the wave. A change in the level of the incident wave changes the part of the crystal characteristic covered. Thus the level of the wave is effective to determine the impedance presented thereto. Since the impedance so presented to an incident wave necessarily has different values for different incident energy levels, the crystals mounted in crystal mounts 48 and 50 can be matched to the wave guides at only one energy level and will therefore present a mismatch to the respective wave guides at all other energy levels.

Figure 4:
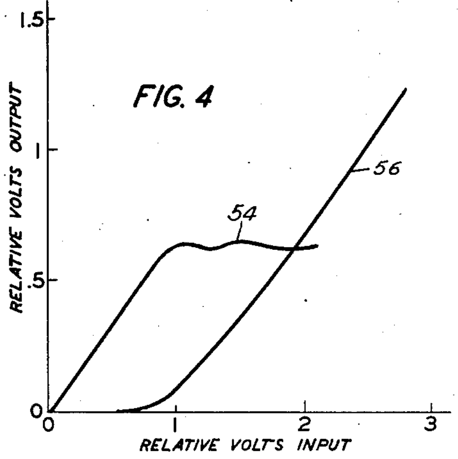
Fig. 4 is a graph illustrating the performance characteristics of the ultra-high frequency circuit of Fig. 3.

If the impedance of the crystals is matched to the respective wave guides at a high level of incident energy, the reflected wave amplitude is roughly proportional to the incident wave amplitude at low signal amplitude levels since the degree of mismatch will then be a maximum. As the amplitude of the incident energy increases, however, the impedance of the crystals will begin to change in a sense to improve the match and the ratio of reflected energy to inicident energy will become smaller. Ultimately, further increase in incident energy will produce no further increase in reflected energy since maximum absorption of the energy by the crystal terminations then occurs. As a result the reflected wave amplitude remains substantialy constant upon increase of the incident energy beyond a certain level. This type of characteristic is shown by curve 54 of Fig. 4 and may be recognized as a conventional limiter characteristic.

If, on the other hand, the crystal impedance is matched for very small amplitudes of incident energy substantially no output will be obtained from arm 32 for low level energy since substantially all such energy incident upon the crystals will be absorbed thereby. As the level of the incident energy is increased, however, the impedance of the crystals will change with the result that the amount of energy reflected from the crystal terminations will increase and an output will appear in arm 32. Because of the usual impedance characteristic of crystals, the amount of reflected energy increases relatively more rapidly than the incident energy as the crystals become progressively more poorly matched to the wave guides in which they are mounted and an input-output characteristic of the type shown by curve 56 of Fig. 4 will be obtained. This characteristic will be recognized as a well-known expander characteristic. This arrangement forms the subject-matter of the copending application of C. C. Cutler referred to above.

In the adjustment of the compressor or expander circuits in accordance with the invention it is necessary only to apply an input wave of appropriate energy level and adjust the position and/or other characteristics of the crystal terminations to obtain minimum output. Thus to obtain a compressor or limiter characteristic, a test signal of very high level is applied to input arm 32' and a suitable output meter is connected to output arm 32. The positions or other characteristics of crystal terminations 48 and 50 are then adjusted until the output meter indicates a minimum. Similarly, the device of Fig. 3 may be adjusted to operate as an expander by applying a test signal of very low energy level to input arm 32' and again adjusting the crystal terminations for minimum output.

What is claimed is:

1. Apparatus for compressing the amplitude range of applied microwave signals comprising a wave-guide junction having at least two pairs of conjugate arms extending therefrom, input and output connections for the respective arms of one of said pairs of conjugate arms, identical non-linear impedances mounted in each arm of another conjugate pair, said impedances being matched to the respective arms in which they are mounted at high signal amplitude levels, and means for phasing the signal energy reflected from said non-linear impedances to obtain voltage addition in another of said conjugate arms.

2. Apparatus for modifying the amplitude range of applied waves comprising a wave-guide hybrid junction having two pairs of conjugate arms extending therefrom, input and output connections for the respective arms of one of said pairs, identical non-linear impedances mounted in the arms of the other of said pairs, said non-linear impedances being matched to the respective arms in which they are mounted at the same high signal amplitude level, and means for introducing a one-quarter wave phase delay connected between said junction and the non-linear impedance in one of said arms.

3. Apparatus for modifying the amplitude range of microwave signals comprising a wave-guide junction having at least two pairs of conjugate arms extending therefrom, input and output connections to the respective arms of one of said pairs of conjugate arms and crystal rectifiers of identical characteristics mounted in each of the arms of another of said pairs, the impedances of said crystal being matched to those of the arms in which they are mounted at a chosen amplitude level, one of said crystal rectifiers being one-quarter wavelength further removed from the junction than the other.

4. Apparatus for modifying the amplitude range of applied waves comprising a wave-guide hybrid junction having a wave-guide section with a pair of arms joined thereto in equivalent shunt and series relationship intermediate the ends thereof to provide two pairs of conjugate arms, input and output connections for the respective arms of one of said pairs, and identical non-linear impedances mounted in the arms of the other pair, the location of the impedance of one of said arms being one-quarter wavelength further removed from the junction than the other and said impedances being matched to the respective arms at the same amplitude level.

5. Apparatus for modifying the amplitude range of applied waves comprising a wave-guide structure having a wave-guide section with a pair of arms joined thereto in equivalent shunt and series relationship, respectively, intermediate the ends thereof to provide two pairs of conjugate arms, input and output connections to the respective ends of said wave-guide section and identical non-linear impedances mounted in said shunt and series arms, the location of the impedance of one of said arms being one-quarter wavelength further removed from the junction than that in the other said arm and the impedances being matched to the respective arms at the same amplitude level.

6. A compressor for modifying the amplitude range of applied microwave signals comprising a wave-guide hybrid junction having a wave-guide section with a pair of arms joined thereto in equivalent shunt and series relationship, respectively, intermediate the ends thereof to provide two pairs of conjugate arms, input and output connections for the respective arms of one of said pairs and identical crystal rectifiers mounted in the arms of the other pair, the impedance of said crystal rectifiers being matched to the respective arms in which they are mounted only at high signal amplitude levels, one of said crystal rectifiers being one-quarter wavelength further removed from the junction than the other crystal rectifier.

7. Apparatus for modifying the amplitude range of applied waves comprising a wave-guide junction having at least two pairs of conjugate arms extending therefrom, input and output connections for the respective arms of one of said pairs of conjugate arms and non-linear impedances mounted in each arm of another pair of said conjugate arms, said impedances being identical and each being matched to its respective arm at a chosen amplitude level and a quarter wavelength wave-guide section connected between said junction and the non-linear impedance mounted in one of said arms.

8. In combination, a system of balanced wave-guides including an input wave-guide, an output wave-guide and a pair of conjugate wave-guides, facilities for coupling a source of oscillations to said input wave-guide to supply oscillations thereto, facilities for deriving power from said output wave-guide, impedances in said conjugate wave-guides, said impedanes being so disposed and so selected that there is phase displacement of 180 degrees between reflections of in-phase waves transmitted respectively along each conjugate wave-guide and reflected by said impedances.

ANSELM F. DIETRICH.

References Cited in the file of this patent

UNITED STATES PATENTS

| Number | Name | Date |
|---|---|---|
| 2,475,474 | Bruck et al. | July 5, 1949 |
| 2,484,256 | Vaughan | Oct. 11, 1949 |